United States Patent
Wey et al.

(10) Patent No.: US 7,383,131 B1
(45) Date of Patent: Jun. 3, 2008

(54) AIRBORNE VOLCANIC ASH CLOUD AND ERUPTION DETECTION SYSTEM AND METHOD

(75) Inventors: Terrence P. Wey, Cedar Rapids, IA (US); Daniel L. Woodell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 11/527,919

(22) Filed: Sep. 27, 2006

(51) Int. Cl.
*G01W 1/00* (2006.01)
(52) U.S. Cl. .......................................................... 702/4
(58) Field of Classification Search .................. 702/15, 702/14, 3, 4
See application file for complete search history.

(56) References Cited

U.S. PATENT DOCUMENTS

| | | | | |
|---|---|---|---|---|
| 5,694,129 | A * | 12/1997 | Fujinawa et al. | 342/22 |
| 5,839,113 | A * | 11/1998 | Federau et al. | 705/4 |
| 6,289,331 | B1 * | 9/2001 | Pedersen et al. | 706/60 |
| 6,364,026 | B1 * | 4/2002 | Doshay | 169/47 |
| 6,381,538 | B1 * | 4/2002 | Robinson et al. | 701/211 |
| 6,490,530 | B1 * | 12/2002 | Wyatt | 702/24 |
| 6,501,392 | B2 * | 12/2002 | Gremmert et al. | 340/971 |
| 6,556,981 | B2 * | 4/2003 | Pedersen et al. | 706/44 |
| 6,650,972 | B1 * | 11/2003 | Robinson et al. | 701/3 |
| 6,828,922 | B1 * | 12/2004 | Gremmert et al. | 340/949 |
| 6,859,416 | B2 * | 2/2005 | Inubushi | 367/7 |
| 6,917,860 | B1 * | 7/2005 | Robinson et al. | 701/3 |
| 7,027,898 | B1 * | 4/2006 | Leger et al. | 701/14 |
| 7,081,834 | B2 * | 7/2006 | Ruokangas et al. | 340/945 |
| 7,248,159 | B2 * | 7/2007 | Smith | 340/539.13 |
| 2003/0212493 | A1 * | 11/2003 | Tanahashi | 702/5 |
| 2004/0012491 | A1 * | 1/2004 | Kulesz et al. | 340/506 |
| 2004/0015336 | A1 * | 1/2004 | Kulesz et al. | 703/11 |

OTHER PUBLICATIONS

Elrod, "Remote Sensing of Volcanic Ash," Found at website: http://www.nwas.org/committees/rs/volcano/ash.htm, as of Jul. 18, 2006, pp. 1-5.
Guffanti, et al, "Reducing the Threat to Aviation From Airborne Volcanic Ash," Presented at 55th Annual International Air Safety Seminar, Nov. 4-7, 2002, Dublin, Found at website: http://volcanoes.usgs.gov/ash/trans/aviation_threat.html, as of Jul. 18, 2006, pp. 1-11.
Paskievitch, et al, "Lightning Associated with the Aug. 18, 1992, Eruption of Crater Peak Vent, Mount Spurr Volcano, Alaska," Geological Survey Bulletin B 2139, (1995) pp. 179-182.
Ewert, et al., "An Assessment of Volcanic Threat and Monitoring Capabilities in the United States: Framework for a National Volcano Early Warning System," USGS Science for a Changing World, Open-File Report 2005-1164, (Apr. 2005), pp. 1-62.

* cited by examiner

*Primary Examiner*—Donald E McElheny, Jr.
(74) *Attorney, Agent, or Firm*—Nathan D. Jensen; Kyle Eppele

(57) ABSTRACT

Systems and methods for detecting volcanic eruption and predicting plume hazards are described. The system comprises a processor and a database having the location of a plurality of volcanoes communicating with the processor. The system also comprises a lightning detector communicating with the processor. The system further comprises a weather radar communicating with the processor. Further still, the weather radar comprises program logic running on the processor. The program logic is configured to correlate the location of a volcano from the database with the presence of lightning from the lightning detector and a volcanic ash plume from the weather radar.

26 Claims, 10 Drawing Sheets

AIRBORNE VOLCANIC ASH CLOUD AND ERUPTION DETECTION SYSTEM AND METHOD

BACKGROUND

The invention generally relates to systems and methods for detecting volcanic ash clouds, volcanic plumes and/or volcanic eruptions from airborne platforms.

It has been observed that aircraft encounters with surprise volcanic eruptions can be catastrophic for the aircraft. The airline industry spends millions of dollars each year contending with volcanic ash from a detection and warning standpoint and a repair cost standpoint. Conventional volcanic ash detection systems provide warnings once a dangerous volcanic condition has been detected yet a reporting gap exists, whereby an aircraft may not have enough time to change its flight path.

Conventionally methods and systems exist for detecting volcanic ash and volcanic eruptions. For example, satellite imaging may be used for detection, however it has the shortcomings of time delay and it may be affected by cloud cover. Ground based measuring devices which are situated on, in, and/or near some volcanoes may provide the required information, however not all known active volcanoes are being monitored. Thus, a system of this type is subject to availability of the requisite data. Another conventional system may utilize ground based weather radar. However, the availability of ground based weather radar is not universal and the accuracy with which the sole use of ground based weather radar to determine volcanic activity, is not high. Conventionally pilot reports of observed volcanic activity may also be used, however this data is unreliable because it is subject to observations which may not occur at all or in a timely manner.

The issue of detecting volcanic activity is worldwide. There are roughly 10,000 volcanic cones (locations) world wide. Of those 10,000 volcanic cones, more than 1,000 are known to be currently active. The Northern Pacific alone contends with 3-4 eruptions a year. Many of the 1,000 known active cones are not ground based monitored. Even on those cones that are monitored, information on those monitored volcanic eruptions may often be delayed.

It has been observed that explosive eruptions can produce lightning. Further, it has been observed that the majority of lightning produced by these eruptions have a positive polarity while a majority of convective weather generated lightning has a negative polarity. Also, it has been observed that large eruptions can produce radar echoes and volcanic ash clouds may be picked up on weather radar. Thus the lightning produced early in the eruption cycle where current warning systems may fail, is both detectable and can be differentiated from lightning produced by weather. However, utilization of these methods has deficiencies when applied to the aircraft/airborne hazard avoidance problem.

Accordingly, there is a need for an improved volcanic ash, volcanic plume, and/or volcanic eruption detection system which provides an indication of a potentially hazardous volcanic ash cloud in a timely manner to an aircraft during or before flight. Use of these techniques before flight suggests ground-based systems based on the same methods as well as airborne operation.

The techniques herein below extend to those embodiments which fall within the scope of the appended claims, regardless of whether they accomplish one or more of the above-mentioned needs.

SUMMARY

What is provided is a system for the detection of volcanic hazards produced during early stages of eruptions. The system comprises a processor and a database having the location of a plurality of volcanoes communicating with the processor. The system also comprises a lightning detector communicating with the processor. The system further comprises a weather radar communicating with the processor. Further still, the weather radar comprises program logic running on the processor. The program logic is configured to correlate the location of a volcano from the database with the presence of lightning from the lightning detector and a volcanic ash plume from the weather radar.

What is also provided is a method of detecting a volcanic ash cloud. The method comprises receiving weather radar information by a processor. The weather radar information indicates the presence of a cloud system at a first location. The method also comprises receiving lightning strike information by the processor. The lightning strike information indicates a volcanic eruption lightning signature at the first location. Further, the method comprises correlating the lightning strike information and the weather radar information of the first location with a volcano location from a volcano location database. Further, what is provided is a method of determining the existence of a volcanic ash plume. The method comprises a way to discriminate weather targets from volcanic plume targets. The method also comprises determining whether a lightning signature is received by a lightning detector having a volcanic lightning signature. Further, the method comprises determining whether the lightning signature and the weather system are over the same approximate location as a known active volcano.

Further still what is provided is a method of providing a volcanic ash alert to a flight crew using ground based data for either the weather radar or lightning portion of the detection method to replace on-aircraft sensors if needed. The method comprises receiving ground based weather radar information. The method also comprises transmitting the ground based weather radar information to the aircraft. Further, the method comprises detecting a volcanic lightning signature. Further still, the method comprises correlating the location of a cloud formation from the weather radar information and the location of the volcanic lightning signature with a known location of an active volcano.

Yet further still, what is provided is a method of changing a flight path. The method comprises determining a volcanic ash threat from a volcanic ash detection system. The method also comprises alerting a flight crew as to the presence of a volcanic ash threat. Further, the method comprises providing the flight crew with a suggested flight path alteration.

Hazards detected by this method may be communicated to other ground based or airborne users in either an automatic or manual fashion.

Yet still further, what is provided is a method of detecting a volcanic ash cloud. The method includes receiving weather radar information by a processor. The weather radar information indicates the presence of a cloud system at a first location. The method also includes correlating with a predetermined likelihood, the weather radar information of the first location with a volcano location from a volcano location database and determining with a confidence level a volcanic ash cloud threat. Further, the method includes providing an alert based on the confidence level.

Alternative exemplary embodiments relate to other features and combinations of features as may be generally recited in the claims.

BRIEF DESCRIPTION OF THE DRAWINGS

A better understanding of the features and advantages of the present invention will be obtained by reference to the following detailed description that sets forth illustrative embodiments by way of example only, in which the principles of the invention are utilized, and the accompanying drawings, of which.

DETAILED DESCRIPTION

Figure 1:
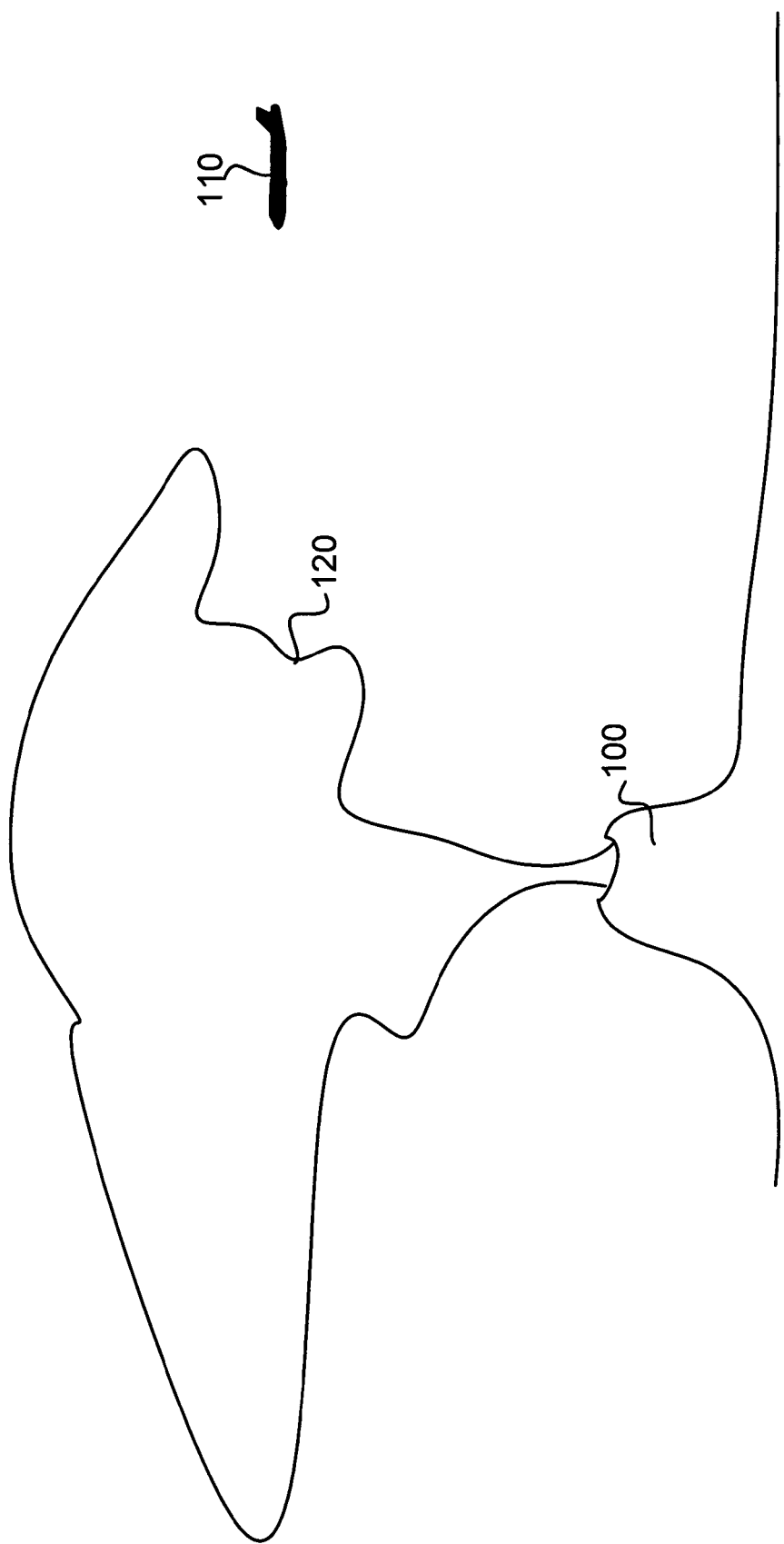
FIG. 1 is an exemplary diagram of a volcano having a volcanic ash cloud.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring now to FIG. 1, a volcano 100 is depicted. Volcanoes such as this occur worldwide and pose a threat to aircraft, such as aircraft 110, when they erupt by producing an ash cloud 120. Volcano 100 may produce large amounts of ash and offensive gases that are jettisoned tens of thousands of feet into the atmosphere, as high as 40,000-50,000 feet in the air or more. Without being alerted, an aircraft 110 may encounter an explosive volcanic eruption and may not have enough time to react to steer clear of the volcanic ash cloud. If the aircraft encounters the volcanic ash cloud, jet engines of the aircraft and avionics systems of the aircraft may be damaged and/or may become inoperable.

Figure 2:
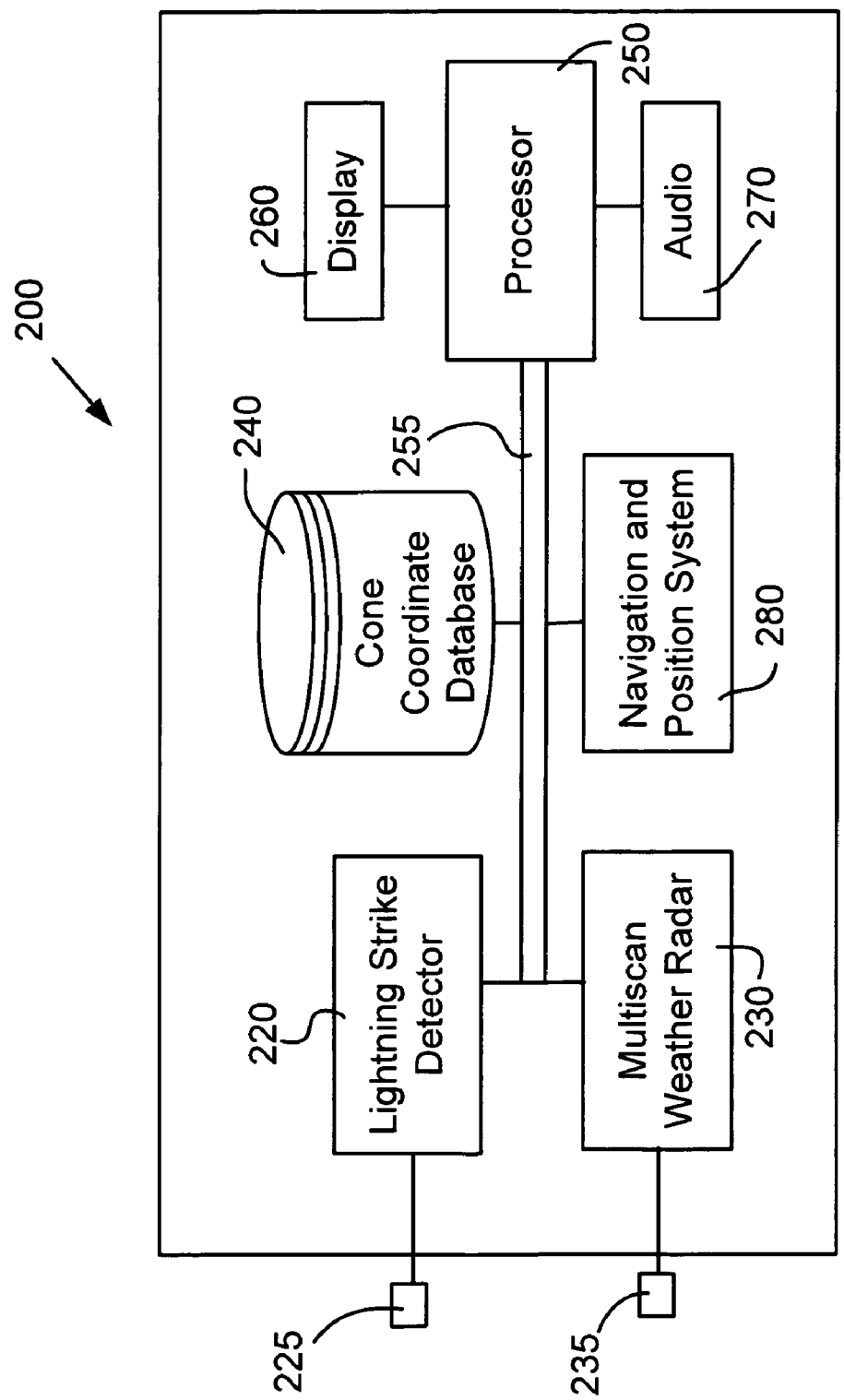
FIG. 2 is an exemplary block diagram of an airborne system for detecting volcanic clouds.

Referring now to FIG. 2, a system 200 is depicted. System 200 includes an aircraft 210 with an onboard volcanic eruption detection system. The system includes a lightning strike detector (e.g., Storm Scope™ or any other type of detector) 220 having a sensor 225, a weather radar (multi-scan or other types) 230 having a radar transceiver 235, and a cone coordinate database 240 communicating over a communications bus 255, or other communication methodologies, with a processor 250. Processor 250 may be coupled to one or more display units 260 for providing visual information to the flight crew and an audio output unit 270 for providing audio information to the flight crew. A navigation and position system 280 along with other aircraft systems may communicate with processor 250.

Figure 3:
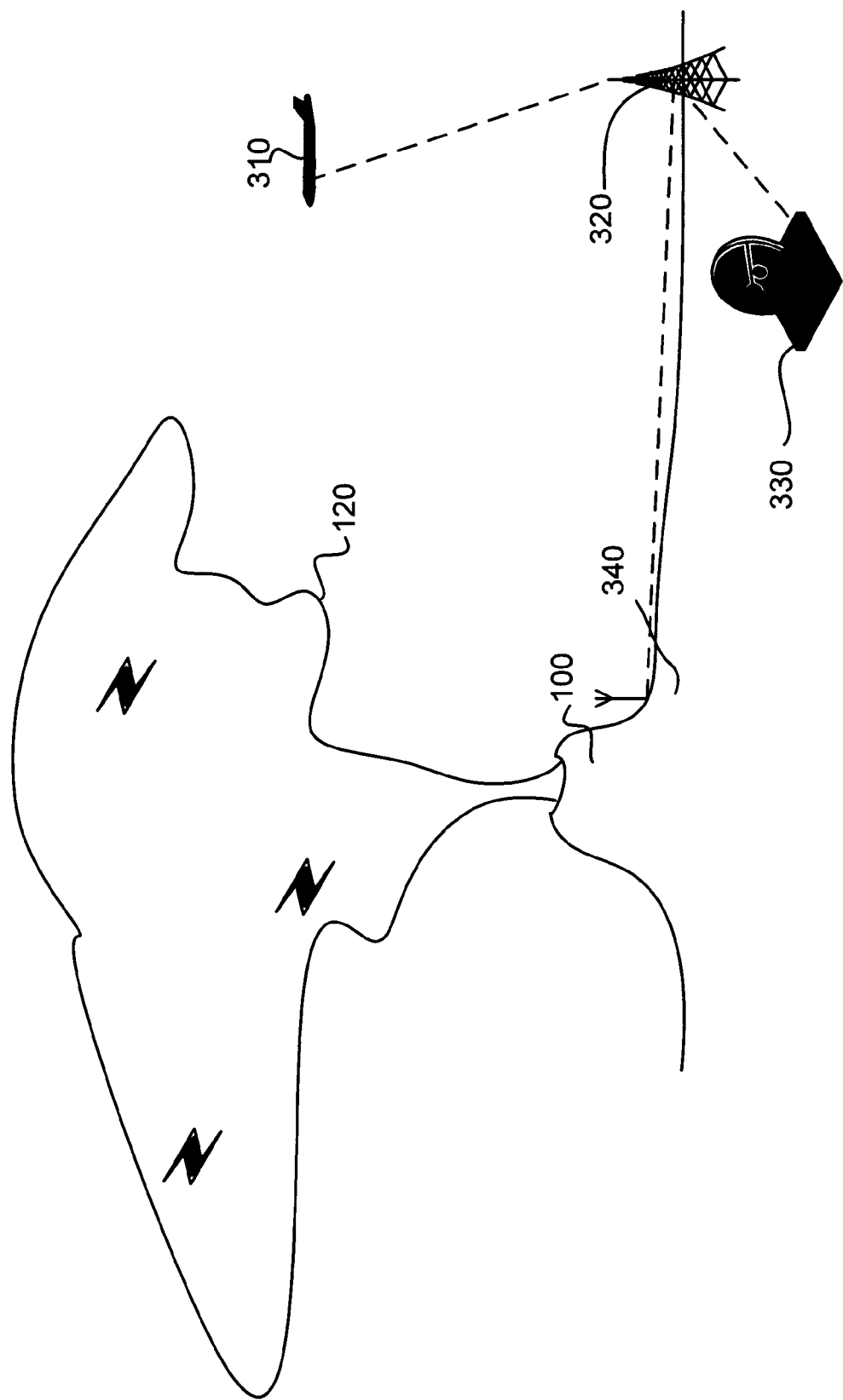
FIG. 3 is an exemplary diagram of a partially ground-based volcanic ash cloud detection system.
Figure 4:
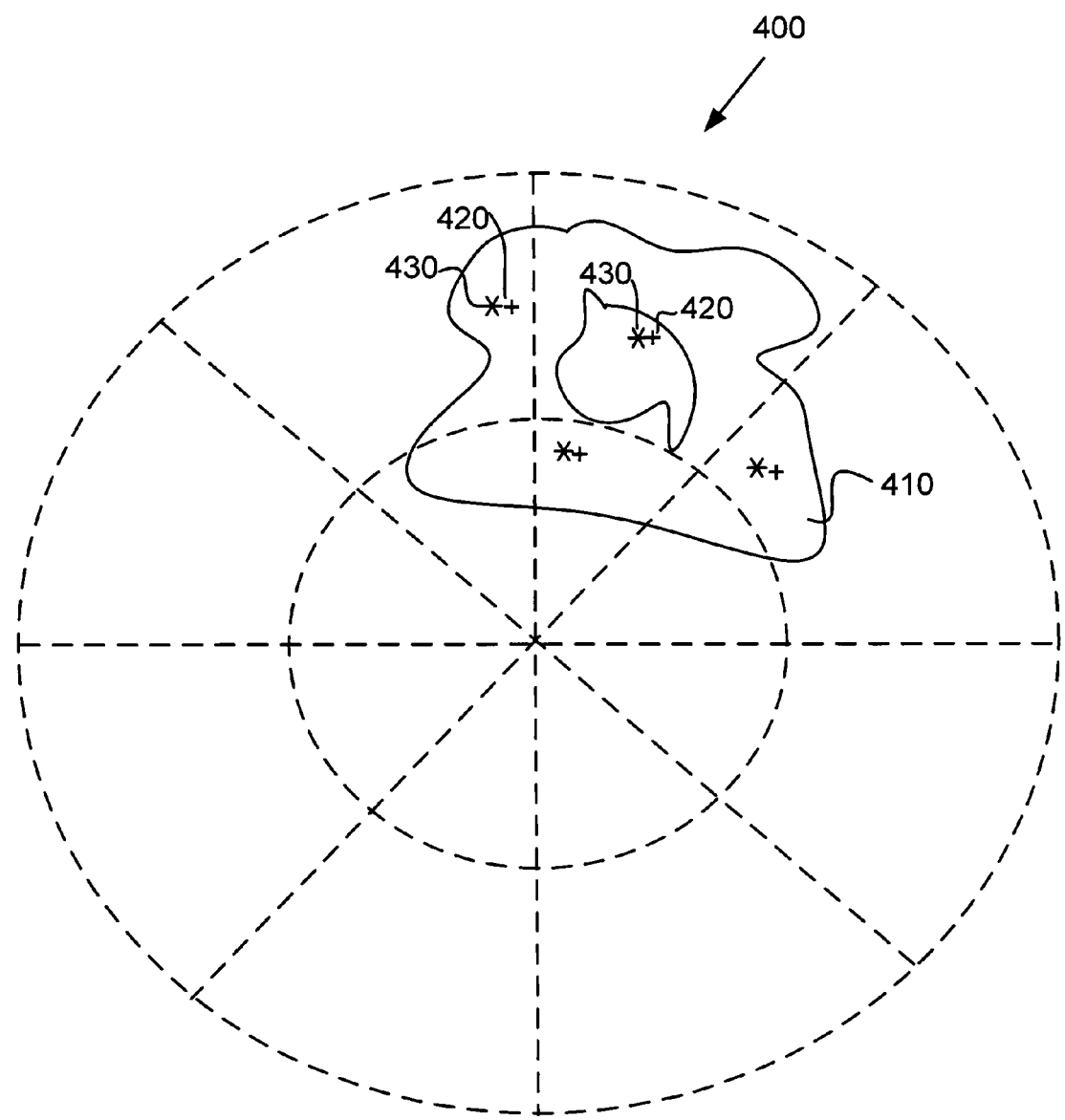
FIG. 4 is an exemplary embodiment of a display showing a volcanic ash cloud, lightning strikes and their polarity.

Many if not all of the potentially active volcanoes worldwide are known and their locations are cataloged in location databases. Such a database may be stored in cone coordinate database 240 that may include activity/threat probabilities as well as location. In an exemplary embodiment, system 200 utilizes the lightning strike detector 220 output, the multi-scan weather radar 230 output, and the on-board cone coordinate database to determine the presence of a volcanic ash cloud. Any or all of the systems may be airborne or alternatively any or all of the information may be communicated to the aircraft from up-linked ground based data, as exemplified in FIG. 3. FIG. 3 is an example of but is not limited to the structure of a system 300 with aircraft 310 which is in radio communication with an antenna 320 that relays radar 330 information to aircraft 310. Other information may be provided, such as but not limited to lightning strike information, volcanic cone location information, and volcano detector 340 information. If the presence of a volcanic ash cloud is determined, an automatic alert may be provided to the flight crew. Such an alert may include an aural warning and/or one or more visual indications and warnings. Also, in an exemplary embodiment, the navigation systems may suggest automatically a new altered flight path. Such information may be provided on the weather radar display, such as exemplified in FIG. 4. Display 400 may be but is not limited to the multiscan weather radar display which shows the detected ash clouds and recent lightning activity 420 with the labeled polarity 430.

An eruption and ash cloud can be detected because explosive eruptions produce lightning. The eruption lightning and plume cloud lightning signature are unique. Current lightning detections system may discriminate between volcanic and weather related lightning.

The weather radar may detect ash eruption columns, ash cloud plumes and/or eruption plumes that are fast pop-up events. The on-board coordinate database contains cone Latitude and Longitudes. The database also contains geologic assessment profiles. In an exemplary embodiment these systems are integrated such that the multiscan radar detects a unique target signature. The lightning detection system detects a unique lightning strike signature. An alert can be provided to the flight crew if the volcanic signatures detected are at approximately the same location as a known volcanic cone as provided by the on-board cone coordinate location.

It has been observed that differentiation between thunderstorm lightning and volcanic lightning exists in most situations. Data from volcanic events have suggested mostly positive polarity lightning and general thunderstorm literature suggests that negative polarity bolts dominate most thunderstorm activity. While the polarities are generally as described, analysis of global events suggests the clear distinction does not exist for all environments and at all times. While it is generally true and most thunderstorms produced lightning of negative polarity, both late maturity cycle highly, glaciated thunderstorms and super-cell thunderstorms may produce a substantial percentage of positive polarity lightning. While volcanoes generally produce positive lightning, situations with predominantly negative lightning have been documented. Because of the uncertainty of the lightning polarity as it relates to volcanic events and thunderstorms, various decision making mechanisms may be applied. In accordance with one embodiment, the intrinsic value of volcano position correlated lightning and radar detection is used. This information is made available to the flight crew as an advisory. Another exemplary embodiment is to take the correlated detections and weigh evidence as to whether an event is either weather or volcano derived. Examples may include the original differentiation criteria after detecting and discounting lightning from weather types that produces positive bolts. Both super-cells and late maturity glaciated cells can be identified by their age and cell history. Detection locations that are located in lines of thunderstorms are also most likely thunderstorms. The same can be said of meso-scale convective complex embedded thunderstorms. Again, cells that give evidence of being weather produced may be removed from the list of possible eruption site detections. Even air-mass thunderstorms that are localized like a volcano eruption may be differentiated from a volcano by their relatively short maturity cycle.

Although the lightning polarity signature may not provide consistent differentiation, it still may be used in some geographic, seasonal, and weather environments. The winter season at moderate to high latitudes is not noted for thunderstorm production. Detections during this season, especially if substantiated by low surface temperatures, are likely to not be generated by a thunderstorm. Long duration lightning activity is not likely to be generated from an air-mass thunderstorm. So a single detection area that produces lightning over lengths of time much greater than the typical air-mass thunderstorm either is a super-cell thunderstorm or is a volcanic driven detection. Such super-cells, like most convective cells propagate in the environment and are not relatively stationary like the volcanic eruption produced detection. The only exception is some air-mass thunderstorms.

In accordance with one exemplary embodiment, to produce a volcanic annunciation the following should be true.

1. The detected area must have both lightning and radar reflection detection.

2. The detected area must be close to a known possible volcano location.

3. The detection must have a strong starting locus.

4. The starting locus of detections must be relatively stationary relative to the volcano's location.

5. The starting locus must not move with the environmental winds.

6. The detected area must not be contained in a larger scale convective weather feature such a squall line, front, or meso-scale convective complex.

7. The detected area must be observed and continue to produce lightning longer than a typical air-mass thunderstorm lifetime of 10 to 20 minutes.

Other criteria may be equally applied without departure from the scope of the invention. For example, it may be desirable to have a number of different alerts such as but not limited to Advisory, Caution and Warning. Each of the different alerts may be based on the confidence level of the available data. For example, it may be possible that the radar system receives information which matches with a volcanic cloud radar signature, but no lightning information is received. In this case it may be desirable to provide an Advisory alert to the flight crew so that they may continue to monitor the information or make a decision to change course based on a relatively low level of confidence that it may actually be a volcanic ash cloud or volcanic ash plume.

Later in ash plumes, there is no lightning. So in an exemplary embodiment, the radar can potentially detect the ash cloud and correlate that cloud with the position of a know volcano, allowing an inference of the cloud being hazardous ash and not non-hazardous water vapor. The Plume shape can be used to estimate direction of winds aloft and thus the direction of movement of the hazard.

Figure 5:
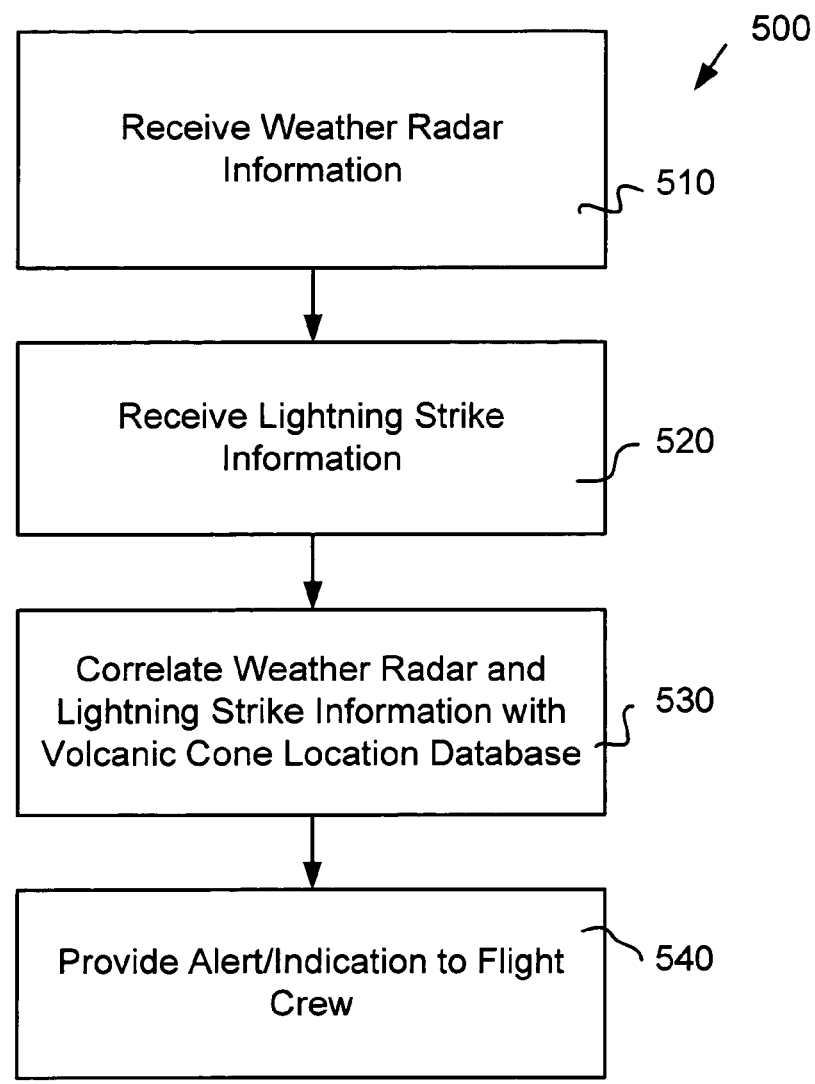
FIG. 5 is an exemplary process diagram of an exemplary embodiment.

Referring now to FIG. 5, a block diagram of a method 500 of providing alerts or indications of volcanic activity to a flight crew, is depicted. Method 500 includes receiving weather radar information by a processor (process 510). The weather radar information indicates the presence of a cloud system at a first location. Lightning strike information is received by the processor (process 520). The lightning strike information indicates a volcanic eruption lightning signature at the first location. The lightning strike information and the weather radar information of the first location is correlated with a volcano location from a volcano location database (process 530). An alert or other indication may then be provided to the flight crew (process 540). Such alerts may be but are not limited to visual and audio indicators. In accordance with an exemplary embodiment, the navigation system on-board the aircraft may generate and suggest automatically, an altered flight path and/or flight plan. Once suggested, the flight crew may then have the ability to choose the altered flight path based on the suggestion.

Figure 6:
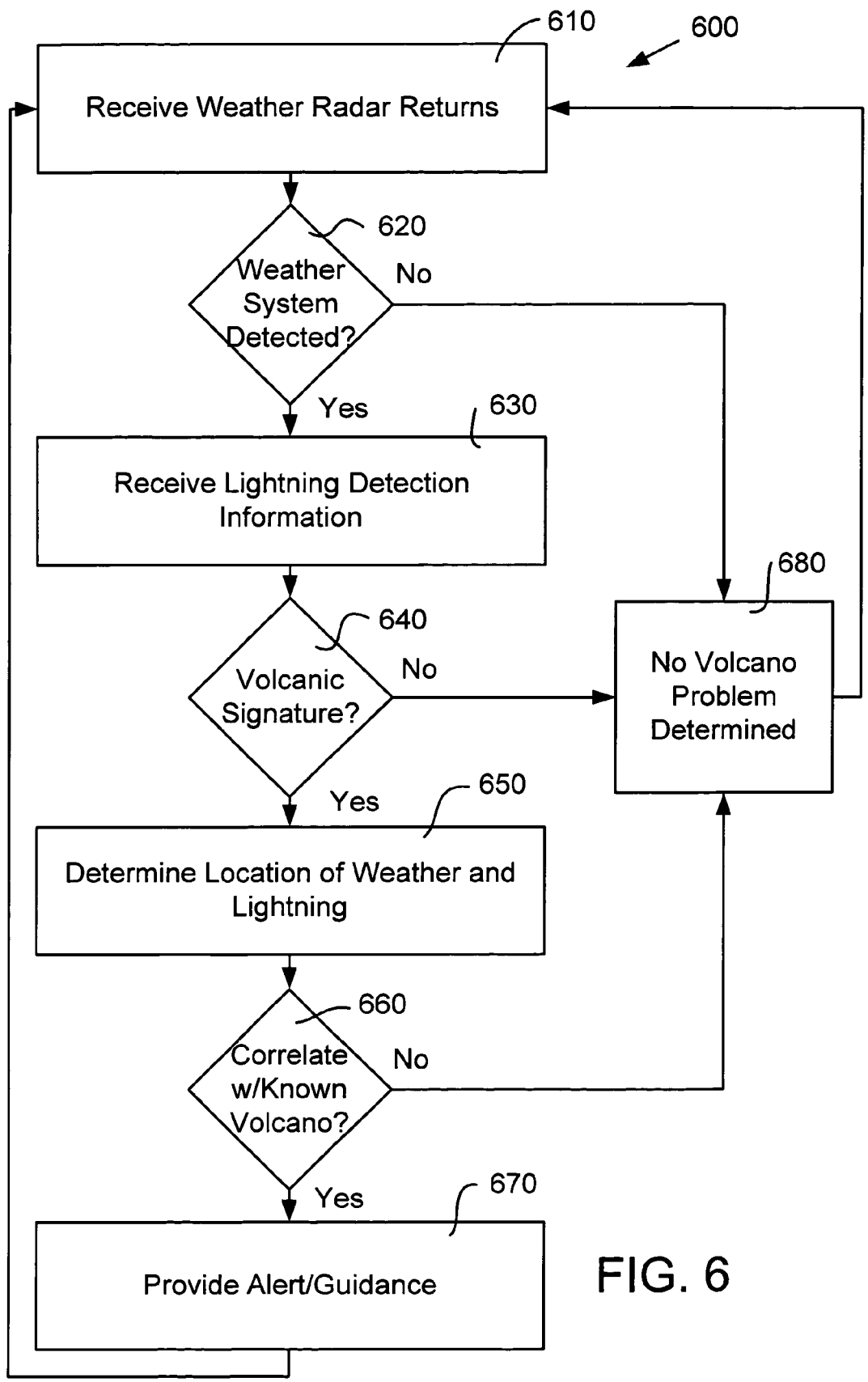
FIG. 6 is an exemplary process diagram of an exemplary embodiment.

In accordance with another exemplary embodiment, a method 600 of determining the existence of a volcanic ash plume is depicted in FIG. 6. Method 600 is exemplary logic which may be instituted in a volcanic ash cloud detection system. The method includes determining whether a weather system is being detected by a weather radar (processes 610 and 620). Also the method includes determining whether a lightning signature received by a lightning detector has a volcanic lightning signature (processes 630 and 640). Once those indicators are determined, the method is used to determine whether the lightning signature and the weather system are over the same approximate location as a known active volcano by determining whether the correlation between the known volcanic location and the location of the indicators is sufficient (processes 650 and 660). Once a sufficient correlation has been determined, alert and/or guidance is provided to the flight crew (process 670). Such guidance may be in the form of a suggested revised flight path or other guidance and/or alerts. Further, by using the weather radar information it may be desirable to have the system determine the direction of drift of the volcanic ash plume. The progression of the volcanic ash plume over time may be predicted. If any of the determinations 620, 640, and 660 generate a negative condition, the system determines that there is no volcanic ash cloud presence (process 680) and the monitoring is continued.

Figure 7:
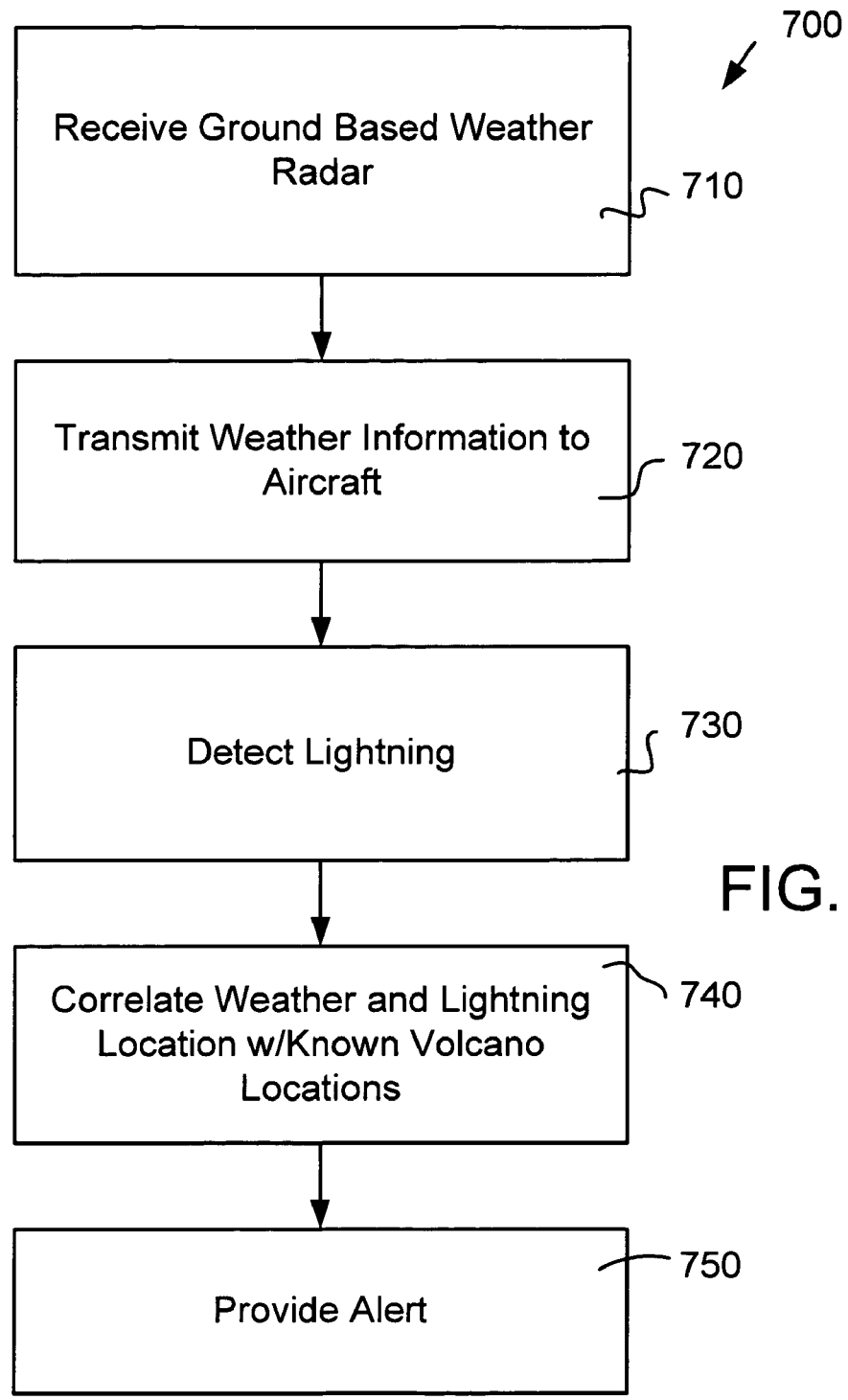
FIG. 7 is an exemplary process diagram of an exemplary embodiment.

Referring now to FIG. 7 a method 700 of providing a volcanic ash alert to a flight crew is depicted. Method 700 includes receiving ground based weather radar information (process 710) and transmitting the ground based weather radar information to the aircraft (process 720). Method 700 also includes detecting a volcanic lightning signature using a lightning detector (process 730) and correlating the location of a cloud formation from the weather radar information and the location of the volcanic lightning signature with a known location of an active volcano (process 740). If the weather and lightning locations correlate with a known volcanic cone location, an alert is provided to the flight crew (process 750).

Figure 8:
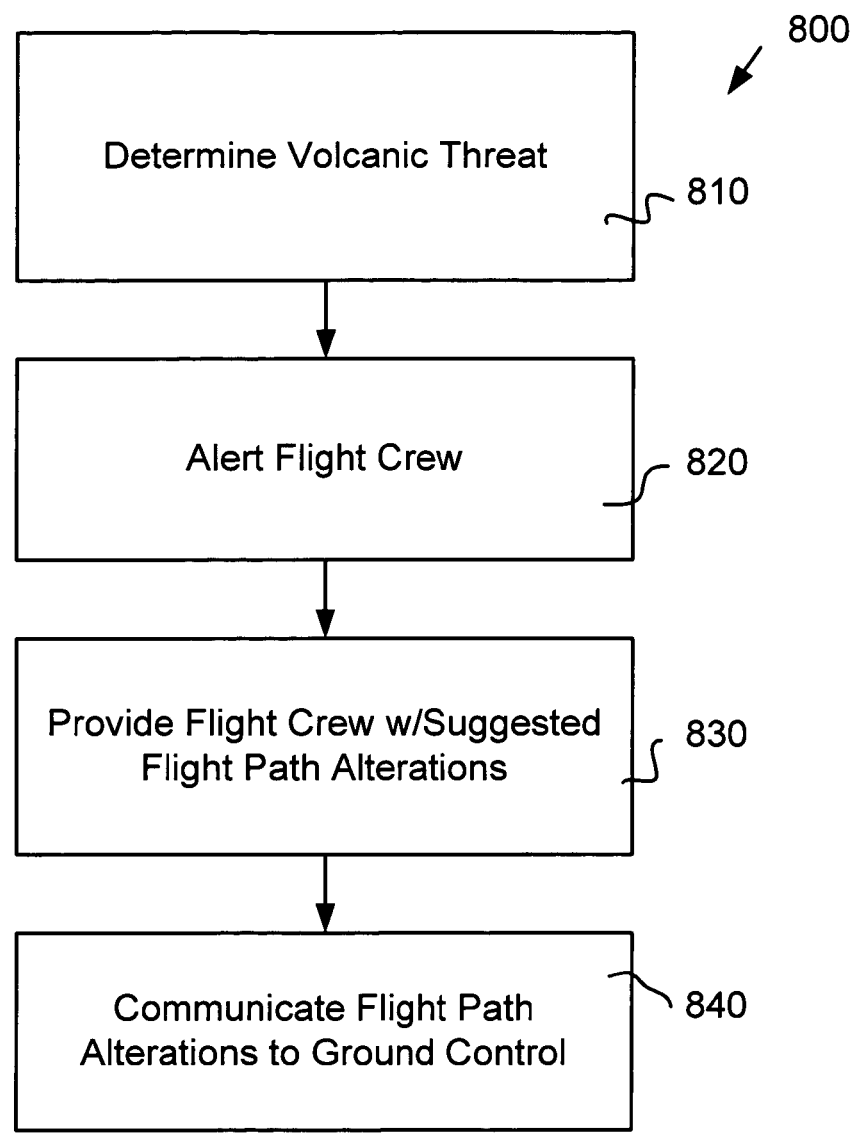
FIG. 8 is an exemplary process diagram of an exemplary embodiment.

Referring now to FIG. 8, a method 800 of changing a flight path is depicted. Method 800 comprises determining a volcanic ash threat from a volcanic ash detection system (process 810). The method also includes alerting a flight crew as to the presence of a volcanic ash threat once it has been determined (process 820). Once the threat has been determined the flight crew is provided with one or more suggested flight path alterations in order to avoid the volcanic ash cloud (process 830). The flight path alteration may then be communicated to a ground-based or other air traffic control system (process 840).

Figure 9:
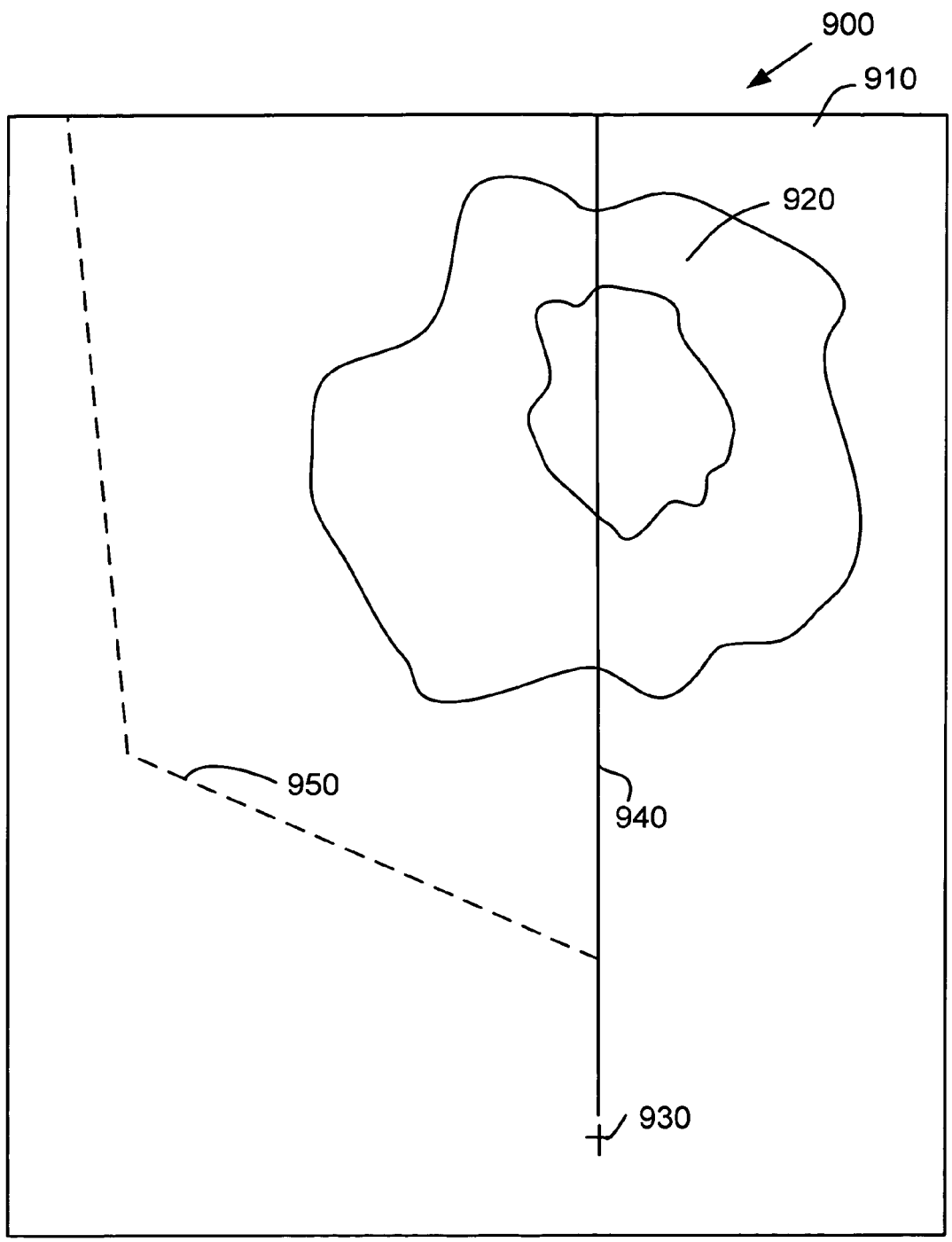
FIG. 9 is an exemplary diagram of a display depicting an altered flight path.

In accordance with an exemplary embodiment, a flight path alteration set up 900 is depicted in FIG. 9. A display 910, which may be but is not limited to a multi-function display in the flight cabin, may be used to display the oncoming volcanic ash cloud 920 which will be encountered by the aircraft 930 if flight along the current flight path 940 continues. Once it is determined that encountering volcanic ash threat 920 is imminent, a suggested flight path alteration 950 may be suggested to the flight crew and displayed on display 910. The flight crew may then choose to maintain the current heading, to elect altered flight path 950, or to choose their own revised flight path.

Figure 10:
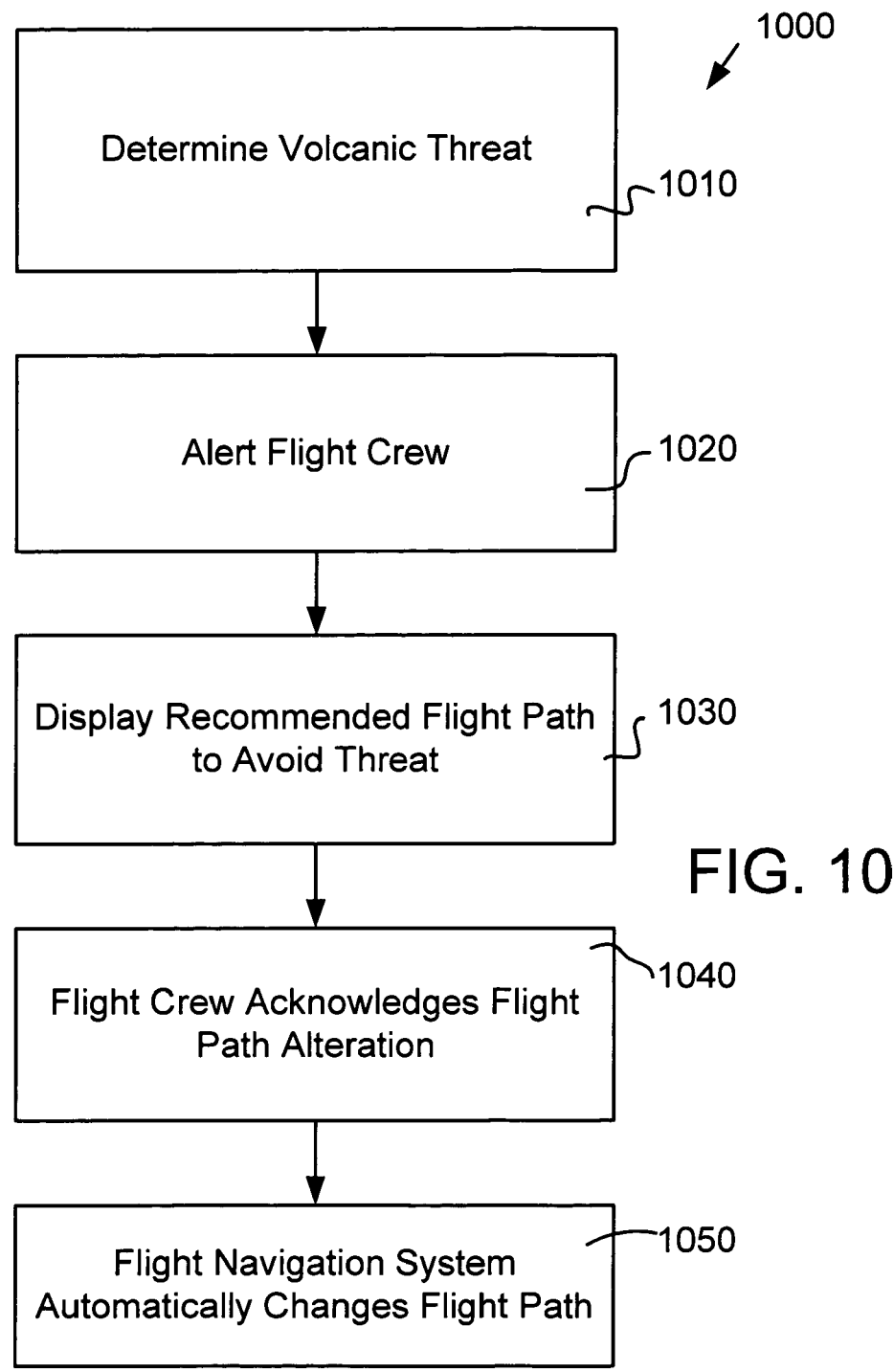
FIG. 10 is an exemplary process diagram of an exemplary embodiment.

Referring now to FIG. 10, an alternative method 1000 of changing a flight path due to a volcanic threat is depicted. Method 1000 starts by determining that a volcanic threat exists using a volcanic cloud identification system (process 1010). Once the threat is identified, the flight crew is alerted (process 1020) and a recommended flight path is displayed to the flight crew (process 1030). The flight crew acknowledges the flight path alteration (process 1040) and the flight navigation system automatically changes the flight path (process 1050).

While the detailed drawings, specific examples, and particular formulations given described exemplary embodiments, they serve the purpose of illustration only. It should be understood that various alternatives to the embodiments of the invention described maybe employed in practicing the invention. It is intended that the following claims define the scope of the invention and that structures within the scope of these claims and their equivalents be covered thereby. The hardware and software configurations shown and described may differ depending on the chosen performance characteristics and physical characteristics of the computing and analysis devices. For example, the type of computing device, communications bus, or processor used may differ. The systems shown and described are not limited to the precise details and conditions disclosed. Method steps provided may not be limited to the order in which they are listed but may be ordered any way as to carry out the inventive process without departing from the scope of the invention. Furthermore, other substitutions, modifications, changes and omissions may be made in the design, operating conditions and arrangements of the exemplary embodiments without departing from the scope of the invention as expressed in the appended claims.

What is claimed is:

1. A system for detecting predicting volcanic eruptions and predicting plume hazards, comprising:
   a processor;
   a database having the location of a plurality of volcanoes and communicating with the processor;
   a lightning detector communicating with the processor;
   a weather radar communicating with the processor; and
   program logic running on the processor, the logic configured to correlate the location of a volcano from the database with the presence of lightning from the lightning detector and a volcanic ash plume from the weather radar.

2. The system of claim 1, wherein the program logic identifies a lightning signature associated with volcanic activity.

3. The system of claim 2, wherein the lightning signature comprises identifying lightning polarity.

4. The system of claim 3, wherein the lightning polarity associated with volcanic activity is identified as positive.

5. The system of claim 1, wherein the system resides on board an aircraft.

6. The system of claim 1, wherein at least a portion of the system is ground-based.

7. The system of claim 1, further comprising:
   an alert system configured to provide a user or using system with an alert of volcanic activity.

8. The system of claim 7, wherein the alert system comprises an audio system capable of providing an aural warning.

9. The system of claim 7, wherein the alert system comprises a visual display capable of providing a visual warning.

10. The system of claim 5, further comprising a navigation and position system providing the position of the aircraft to the processor.

11. The system of claim 9, wherein a new flight path is generated by the navigation and position system based on an indication of the oncoming presence of a volcanic ash cloud.

12. A method of detecting a volcanic ash cloud, comprising:
   receiving weather radar information by a processor, the weather radar information indicating the presence of a cloud system at a first location;
   receiving lightning strike information by the processor, the lightning strike information indicating a volcanic eruption lightning signature at the first location; and
   correlating with a predetermined likelihood, the lightning strike information and the weather radar information of the first location with a volcano location from a volcano location database.

13. The method of claim 12, further comprising:
   determining that a volcanic ash cloud may exist above an area proximate the first location.

14. The method of claim 12, further comprising:
   providing an alert to flight crew of the presence of the volcanic ash cloud.

15. The method of claim 13, wherein the alert comprises a visual indicator.

16. The method of claim 13, wherein the alert comprises an aural indicator.

17. The method of claim 12, further comprising:
   generating automatically, a changed flight plan.

18. A method of determining the existence of a volcanic ash plume, comprising:
   determining whether a weather system is being detected by a weather radar;
   determining whether a lightning signature received by a lightning detector has a volcanic lightning signature; and
   determining whether the lightning signature and the weather system are over the same approximate location as a known active volcano.

19. The method of claim 18, further comprising:
   determining the direction of drift of the volcanic ash plume.

20. The method of claim 18, further comprising:
predicting the progression of the volcanic ash plume over time.

21. A method of providing a volcanic ash alert to a flight crew, comprising:
receiving ground based weather radar information;
transmitting the ground based weather radar information to the aircraft;
detecting a volcanic lightning signature;
correlating with a predetermined likelihood, the location of a cloud formation from the weather radar information and the location of the volcanic lightning signature with a known location of an active volcano.

22. The method of claim 21, further comprising:
communicating a change in flight path to an air traffic control system.

23. The method of claim 21, further comprising:
displaying a suggested flight path alteration to the flight crew on a display.

24. The method of claim 23, further comprising:
acknowledging, by the flight crew, the flight path alteration.

25. The method of claim 23 further comprising:
changing the flight path of the aircraft by a flight navigation system, in response to the acknowledgement.

26. A method of detecting a volcanic ash cloud, comprising:
receiving weather radar information by a processor, the weather radar information indicating the presence of a cloud system at a first location;
correlating with a predetermined likelihood, the weather radar information of the first location with a volcano location from a volcano location database and determining with a confidence level a volcanic ash cloud threat; and
providing an alert based on the confidence level.

* * * * *